United States Patent
Budinger

(10) Patent No.: US 7,775,416 B2
(45) Date of Patent: Aug. 17, 2010

(54) MICROWAVE BRAZING PROCESS

(75) Inventor: David Edwin Budinger, Loveland, OH (US)

(73) Assignee: General Electric Company, Schenectady, NY (US)

( * ) Notice: Subject to any disclaimer, the term of this patent is extended or adjusted under 35 U.S.C. 154(b) by 238 days.

(21) Appl. No.: 11/564,898

(22) Filed: Nov. 30, 2006

(65) Prior Publication Data

US 2008/0290137 A1    Nov. 27, 2008

(51) Int. Cl.
*B23K 23/00* (2006.01)

(52) U.S. Cl. .................... 228/248.1; 228/119

(58) Field of Classification Search ............. 228/248.1, 228/119
See application file for complete search history.

(56) References Cited

U.S. PATENT DOCUMENTS

| | | | |
|---|---|---|---|
| 5,321,223 A | 6/1994 | Kimrey, Jr. et al. | |
| 5,397,530 A | 3/1995 | Narasimhan et al. | |
| 5,736,092 A | 4/1998 | Apte et al. | |
| 5,740,941 A | 4/1998 | Lemelson et al. | |
| 5,808,282 A | 9/1998 | Apte et al. | |
| 6,004,505 A | 12/1999 | Roy et al. | |
| 6,063,333 A | 5/2000 | Dennis | |
| 6,155,331 A | 12/2000 | Langer et al. | |
| 6,165,616 A | 12/2000 | Lemelson et al. | |
| 6,172,346 B1 | 1/2001 | Wroe | |
| 6,183,689 B1 | 2/2001 | Roy et al. | |
| 6,293,986 B1 | 9/2001 | Rodiger et al. | |
| 6,512,216 B2 | 1/2003 | Gedevanishvili et al. | |
| 6,610,241 B2 | 8/2003 | Shrout et al. | |
| 6,805,835 B2 | 10/2004 | Roy et al. | |
| 6,870,124 B2 | 3/2005 | Kumar et al. | |
| 2002/0106611 A1 | 8/2002 | Bhaduri et al. | |
| 2004/0050913 A1* | 3/2004 | Philip | 228/194 |
| 2005/0281704 A1* | 12/2005 | Srinivasan | 420/437 |
| 2006/0071053 A1 | 4/2006 | Garimella | |

FOREIGN PATENT DOCUMENTS

| | | |
|---|---|---|
| EP | 0456481 | 5/1991 |
| EP | 1642666 | 4/2006 |
| WO | WO2004073037 | 8/2004 |
| WO | WO2007006694 | 1/2007 |

\* cited by examiner

*Primary Examiner*—Jessica L Ward
*Assistant Examiner*—Nicholas P D'Aniello
(74) *Attorney, Agent, or Firm*—William Scott Andes; Gary M. Hartman; Domenica N.S. Hartman

(57) ABSTRACT

A process for heating a braze alloy by microwave radiation so that heating of the alloy is selective and sufficient to cause complete melting of the alloy and permit metallurgical bonding to a substrate on which the alloy is melted, but without excessively heating the substrate so as not to degrade the properties of the substrate. The process entails providing metallic powder particles having essentially the same metallic composition, with at least some of the particles being sufficiently small to be highly susceptible to microwave radiation. A mass of the particles is then applied to a surface of a substrate, after which the mass is subjected to microwave radiation so that the particles within the mass couple with the microwave radiation and sufficiently melt to metallurgically bond to the substrate. The microwave radiation is then interrupted and the mass is allowed to cool, solidify, and form a solid brazement.

15 Claims, 1 Drawing Sheet

MICROWAVE BRAZING PROCESS

BACKGROUND OF THE INVENTION

This invention generally relates to brazing methods, including processes and materials for use in the manufacturing, coating, repair, and build-up of superalloy components. More particularly, this invention relates to a method of brazing a superalloy, in which microwave energy is employed to melt a braze alloy that contains minimal or no melting point depressants relative to the superalloy being brazed.

Nickel, cobalt, and iron-base superalloys are widely used to form high temperature components of gas turbine engines. While some high-temperature superalloy components can be formed as a single casting, others are preferably or required to be fabricated by other processes. As an example, brazing is widely used to fabricate gas turbine components, as in the case of high pressure turbine nozzle assemblies. Brazing techniques conventionally encompass joining operations performed at an elevated temperature but sufficiently below the melting points of the superalloys being joined so as not to cause grain growth, incipient melting, recrystallization, or unfavorable phase formation that can lead to degradation of the alloys. In carrying out the brazing process, an appropriate braze alloy is placed between the interface (faying) surfaces to be joined, and the faying surfaces and the braze alloy therebetween are heated in a vacuum to melt the braze alloy. The braze alloy melts at a lower temperature than the superalloy base material as a result of containing one or more melting point depressants, such as boron and/or silicon in an amount greater than the superalloy(s) being brazed. For example, whereas superalloys containing intentional amounts (above impurity levels) of boron and/or silicon typically contain less than 0.1 weight percent of each, braze alloys that contain boron and/or silicon as melting point depressants typically contain at least 2.0 weight percent boron, or at least 6.0 weight percent silicon, or both silicon and boron at a ratio of about 3:1. On cooling, the braze alloy solidifies to form a permanent metallurgical bond.

During engine operation, gas turbine engine components are subject to strenuous high temperature conditions under which various types of damage or deterioration can occur. As examples, erosion and oxidation reduce wall thicknesses of turbine nozzles and vanes, and cracks can initiate at surface irregularities and propagate as a result of stresses that are aggravated by thermal cycling. Because the cost of components formed from superalloys is relatively high, it is often more desirable to repair these components rather than replace them. In response, brazing techniques have been developed for crack repair and wall thickness build-up that entail placing a braze alloy filler metal on the surface area requiring repair, and then heating the filler metal in a vacuum to above its melting point, but below that of the surface substrate, so that the molten filler metal wets, flows, and fills the damaged area.

While widely employed to fabricate and repair gas turbine engine components, conventional brazing processes have notable disadvantages. For example, the entire component must be subjected to a vacuum heat treatment, which is a very lengthy process in a production environment, unnecessarily exposes undamaged regions of the component to high temperatures, and can potentially remelt joints in other sections of the component. Furthermore, though braze alloys typically have compositions similar to the base metal of the component being brazed, the presence of boron and/or silicon in a braze alloy as a melting point suppressant reduces the mechanical and environmental properties of the resulting brazement as a result of the minimal ductility of the borides and silicides they form by reaction with refractory elements. Boron and silicon can also diffuse into the base metal repaired by the brazement to adversely affect the mechanical and environmental properties of the component.

Microwave brazing has been investigated as a potential candidate for eliminating these issues, as heating can be localized to selected areas of a component. The general approach has been to use a susceptor (e.g., SiC enclosure) that is heated when exposed to microwave energy and, in turn, transfers the heat to the component by radiation. Drawbacks include the lack of local heating of the braze alloy only, as an entire region of the component is inevitably heated, and significant heat loss from radiation in directions away from the intended brazement.

BRIEF SUMMARY OF THE INVENTION

The present invention generally provides a process for heating a braze alloy by microwave radiation so that heating of the alloy is selective and sufficient to cause complete melting of the alloy and permit metallurgical bonding to a substrate on which the alloy is melted, but without excessively heating the substrate so as not to degrade the properties of the substrate. The invention is particularly beneficial for use in brazing operations for the purpose of metallurgically joining superalloys and coating, repairing, and building up of superalloy surfaces.

The process generally entails providing metallic powder particles having essentially the same metallic composition, with at least some of the metallic powder particles being sufficiently small to be highly susceptible to microwave radiation. A mass of the metallic powder particles is then applied to a surface of a substrate, after which the mass is subjected to microwave radiation so that the metallic powder particles within the mass couple with the microwave radiation and sufficiently melt to metallurgically bond to the substrate. The microwave radiation is then interrupted and the mass is allowed to cool, solidify, and form a solid brazement.

According to a preferred aspect of the invention, the metallic powder particles may have the same metallic composition as the substrate on which the mass of particles was applied and melted. According to another aspect of the invention, all of the metallic powder particles are sufficiently small to be significantly more susceptible to absorbing microwave energy than the substrate, which predominantly reflects the microwaves. As a result, complete melting of the particles can be achieved accompanied by only surface melting of the substrate caused by heat transfer from the particles to the substrate by thermal conduction. Such a result may be obtained even if the metallic powder particles have the same or even higher melting temperature than the substrate. Finally, melting of the particles can be achieved even if their metallic composition is free of melting point depressants, such as boron and silicon, beyond amounts conventionally used in superalloys.

From the above, it can be appreciated that the process of this invention can be applied to various processes in which heating of a powdered material is desired, for example, the forming of coatings including the repair or build-up of a damaged surface and the metallurgical joining of components by brazing. Because heating is by microwave radiation, the heating rate and melting of the powder particles are influenced by susceptibility to microwave radiation instead of location relative to a heating source or relative to any surface contacted by the powder mass. This aspect of the invention enables the powder mass to melt prior to melting of the surface contacted by the mass. As a result, the powder particles can be formed of an alloy having the same melting temperature (for example, within 150° C.) as the surface contacted by the powder mass.

Other objects and advantages of this invention will be better appreciated from the following detailed description.

DETAILED DESCRIPTION OF THE INVENTION

The invention will be described with specific reference to processing of components for a gas turbine engine, and particularly the fabrication and repair of such components with a braze material. However, the invention has application to a variety of components, materials, and processes other than those discussed, and such variations are within the scope of this invention.

Figure 2:
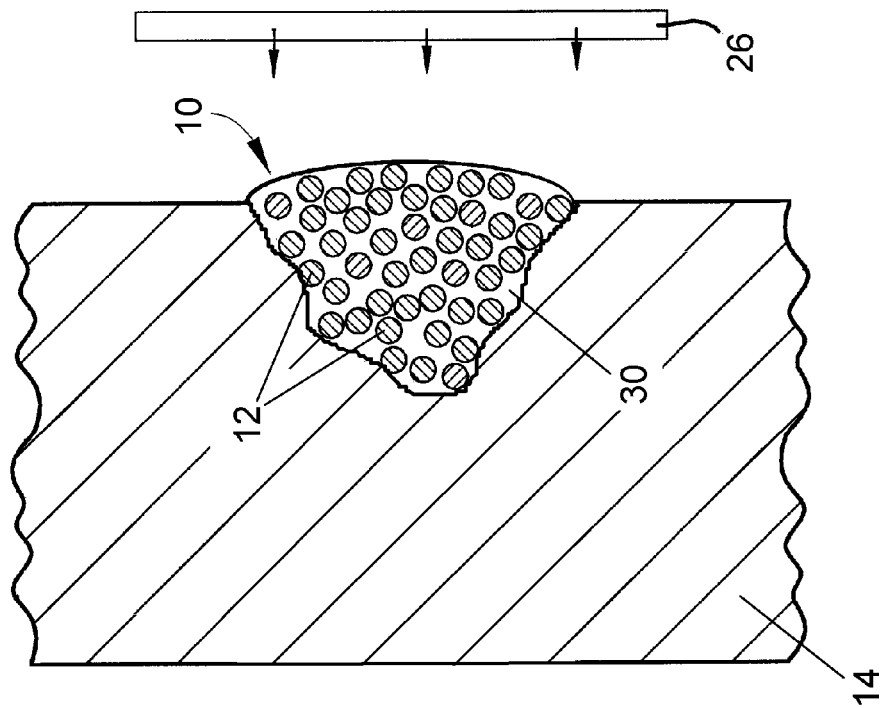
FIG. 2 schematically represents a mass of powder metal particles similar to that of FIG. 1 but deposited on a surface of a substrate containing a defect in accordance with the invention.
Figure 1:
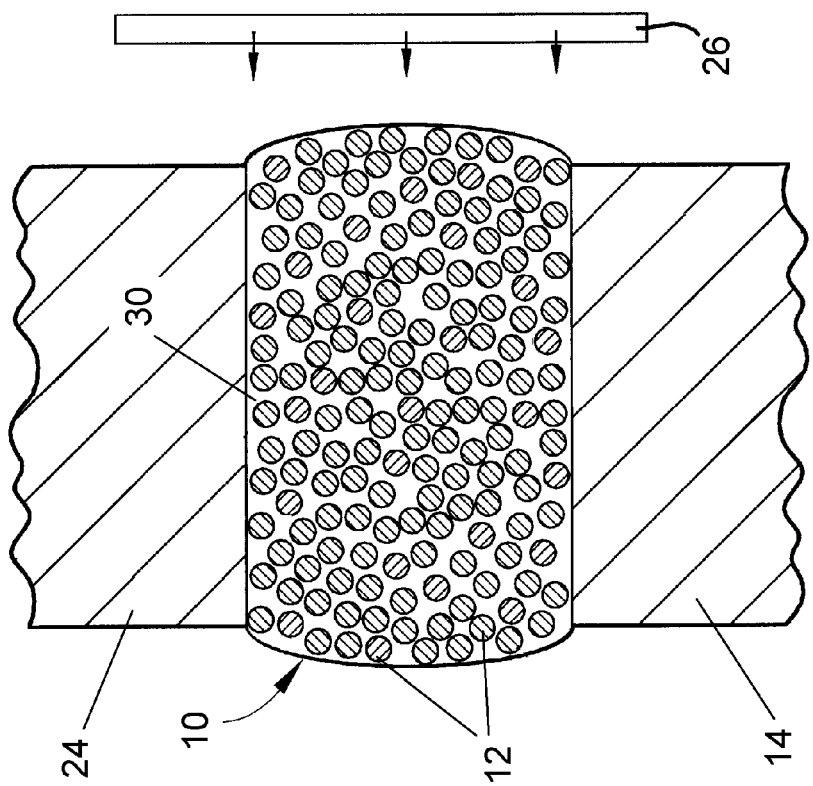
FIG. 1 schematically represents a mass of powder metal particles between a pair of substrates, in which the powder metal particles are susceptible to microwave heating to enable microwave brazing in accordance with an embodiment of the present invention.

FIGS. 1 and 2 depict embodiments of this invention, in which consistent reference numbers are used to identify functionally similar structures. FIG. 1 schematically represents a mass 10 of powder metal particles 12 between and contacting opposing surfaces of two substrates 14 and 24 to be metallurgical joined by the particles 12, and FIG. 2 schematically represents a mass 10 of powder metal particles 12 deposited on a surface of a substrate 14 for the purpose of repairing a defect in the surface. As discussed below, the invention provides a process by which the particles 12 are melted and resolidified to form brazements that join the substrates 14 and 24 of FIG. 1 and repair the surface defect of FIG. 2. Though the mass 10 of particles 12 is shown as being directly placed between the substrates 14 and 24 in FIG. 1, and the mass 10 of particles 12 is shown as placed directly within the defect in FIG. 2, it will be understood by those skilled in the art that the particles 12 could be placed adjacent a gap between the substrates 14 and 24 in FIG. 1 or over the defect in FIG. 2, and allowed to flow into the gap and defect by capillary action when molten. In both FIGS. 1 and 2, the particles 12 are shown as being contained within a binder 30 that, according to known brazing practices with braze pastes, burns off during the brazing process, which is preferably performed in an inert or low pressure atmosphere to minimize oxidation of the particles 12 and any surfaces (e.g., substrates 14 and 24) to which the particles 12 are bonded. Either or both substrates 14 and 24 may be formed of a superalloy, whose composition or compositions will depend on the particular type of component and its anticipated operating conditions. As will be noted below, various other metallic materials are also possible for the substrates 14 and 24, and therefore within the scope of the invention.

According to the invention, the mass 10 of particles is melted as a result of being subjected to microwave radiation 26, as discussed in more detail below. The powder particles 12 can be formed of a variety of materials, limited only by the requirement that the particles 12 have a composition that is capable of being heated by microwave radiation 26 and is compatible with the materials of the substrates 14 and 24 while at the maximum heating temperature induced by microwave radiation 26. Materials capable of being heated when subjected to microwave radiation include non-conductors and conductors under appropriate conditions. Microwave radiation has varying electric and magnetic fields that are believed to cause direct electric heating and heating through magnetic effects, respectively. For compatibility with the metallic substrates 14 and 24, the particles 12 employed by this invention are metallic and are believed to be heated by a combination of electrical and magnetic effects, with the latter possibly being the dominant effect. Compatibility is assured if the particles 12 have the very same composition as that of the substrates 14 and 24, though suitable compatibility can also be achieved if the particles 12 and substrates 14 and 24 do not have compositions prone to detrimental interdiffusion at elevated temperatures that would lead to loss of desired mechanical or environmental properties. The particles 12 may be a conventional braze alloy that contains significant amounts of one or more melting point depressants, such as up to two weight percent boron or up to six weight percent silicon, or some combination of both. Conversely, the particles 12 may contain elements capable of serving as a melting point depressant at only impurity levels or in only limited amounts that do not exceed the levels for those same elements in the substrate 14 or substrates 14 and 24 being brazed, for example, less than 0.1 weight percent for both boron and silicon in typical nickel-base superalloys. Another alternative is to form the particles 12 to have a composition that contains lower amounts of boron and/or silicon than typically added as a melting point depressant, for example, less than one weight percent of boron and/or less than three weight percent of silicon. As such, it is possible for the particles 12 to contain one or more melting point suppressants, though not at levels that would lead to an unacceptable loss of properties in the substrates 14 and 24 as a result of diffusion of the suppressant into the substrates 14 and 24 during heating of the particles 12 and later during the life of the substrates 14 and 24. Furthermore, the particles 12 can be formed of a superalloy such as of the type used in turbine applications, or an alloy whose base composition is similar to that of the substrates 14 and 24 but modified to contain alloying constituents different from or at different levels than the substrates 14 and 24. Though all of the particles 12 are not required to have the same composition, the present invention permits such uniformity.

According to a preferred aspect of the invention, at least some and preferably all of the powder particles 12 must be sufficiently small to be highly susceptible to microwave radiation 26, thereby preferentially coupling with the microwave radiation 26 (as compared to the substrates 14 and 24) to significantly enhance heating and melting of the particles 12 by the microwave radiation 26. Coupling with the microwave radiation 26 is believed to be the result of the metallic particles 12 being sufficiently conductive to generate eddy currents induced by the magnetic field of the microwave radiation 26, while possibly also possessing a level of electrical resistivity capable of generating joule heating from the eddy currents. It is known that the magnetic loss component of susceptibility for a material in very fine powder size is dependent on factors such as microwave power and frequency. Conversely, for a given microwave power and frequency, the interaction between microwave and individual metals or alloys will be optimum at a distinct particle size, usually on the order of a few tens of nanometers for conventional microwave conditions (about 2.45 GHz and about 1 to about 10 kW power). Particle sizes above or below that size will not couple as well with the microwave radiation. Consequently, suitable and preferred maximum sizes for the particles 12 will depend on the particular application, temperatures, and materials involved. Generally speaking, it is believed that a maximum particle size is on the order of about 150 mesh (about 100 micrometers), more preferably less than 325 mesh (about 44 micrometers). Minimum particle sizes can be as little as nanoscale, e.g., less than 100 nanometers such as on the order of about 10 nanometers.

In contrast to the particles 12, bulk metals such as the substrates 14 and 24 tend to reflect microwave radiation. As noted above, this aspect of the present invention makes possible the brazing of superalloy substrates 14 and/or 24 with alloys having the very same composition as the substrate 14/24, as well as alloys with the same or even higher melting point as the substrate 14/24. For example, a nickel-base superalloy component can be joined or repaired with a braze material of the same nickel-base superalloy composition or another nickel-base alloy, in other words, an alloy whose base metal is the same as the base metal of the substrate 14/24. In this manner, degradation of the properties of the substrate 14/24 resulting from interdiffusion with the braze material can be essentially if not entirely avoided. In view of the capability of melting particles 12 formed of an alloy having a melting point above that of the substrate 14/24, it should be appreciated that the term "brazing" as used herein is not limited to the conventional limitation of a joining operation performed at a temperature below the melting point of the metals being joined.

Microwave radiation is preferably applied to the powder mass 10 in a multi-mode cavity, which as known in the art provides for a microwave field that does not establish a standing wave, but instead provides a uniform amplitude of both its magnetic and electric components. Alternatively, a single-mode cavity can be used, in which case a standing or traveling wave is propagated, enabling imposition, to a certain extent, the relative amplitudes of the electric and magnetic components of the microwave field. A wide range of microwave frequencies could be used with the present invention, though regulations generally encourage or limit implementation of the invention to typically available frequencies, e.g., 2.45 GHz and 915 MHz, with the former believed to be preferred. However, it should be understood that other frequencies are technically capable of use. A benefit of using a lower frequency is the greater associated wavelength, which may be better suited for higher power transmission or processing of larger components. Suitable microwave power levels will depend on the size and composition of the particles 12, but are generally believed to be in a range of about 1 to about 10 kW, though lesser and greater power levels are also foreseeable.

In an experiment using a multi-mode microwave cavity, about 5 grams of a nanoscale-sized nickel powder and about 25 g of a nickel powder sieved to −325 mesh were subjected to microwave radiation at frequencies of about 2.45 GHz and power levels of about 1 kW. A maximum temperature of about 1140° C. (about 2085° F.) was obtained for the finer nickel powder, while the coarser nickel powder only attained a temperature of about 817° C. (about 1500° F.), evidencing the greater susceptibility of the finer powder particles to heating by microwave radiation.

While the invention has been described in terms of particular embodiments, it is apparent that other forms could be adopted by one skilled in the art. Accordingly, the scope of the invention is to be limited only by the following claims.

The invention claimed is:

1. A brazing process comprising:
    selecting a substrate and a mass of metallic powder particles on the basis of the substrate being sufficiently large to reflect microwave radiation at a power level and frequency level and at least some of the metallic powder particles having a maximum particle size of less than 100 nanometers to cause selective coupling of the metallic powder particles with the microwave radiation at the power and frequency levels when the metallic powder particles and the substrate are simultaneously subjected to the microwave radiation at the power and frequency levels, wherein the metallic powder particles have a higher melting temperature than the substrate;
    applying the mass of metallic powder particles to a surface of the substrate;
    subjecting the mass to the microwave radiation at the power and frequency levels so that the substrate reflects the microwave radiation and the metallic powder particles within the mass couple with the microwave radiation and sufficiently melt to metallurgically bond to the substrate; and then
    interrupting the microwave radiation and allowing the mass to cool, solidify, and form a solid brazement.

2. The process according to claim 1, wherein all of the metallic powder particles within the mass have the same metallic composition.

3. The process according to claim 2, wherein the mass of metallic powder particles contains less than one weight percent of boron and/or less than three weight percent of silicon.

4. The process according to claim 2, wherein the mass of metallic powder particles contains boron and silicon as impurities only.

5. The process according to claim 1, wherein the substrate is formed of a nickel-base superalloy.

6. The process according to claim 1, wherein all of the metallic powder particles have a maximum particle size of about 100 micrometers.

7. The process according to claim 1, wherein the metallic powder particles have a maximum particle size of about 44 micrometers.

8. The process according to claim 1, wherein the brazement metallurgically bonds to the substrate to form a repair region on the substrate as a result of the melting of the metallic powder particles and cooling of the mass to form the brazement.

9. The process according to claim 1, wherein the brazement metallurgically bonds the substrate to a second substrate as a result of the melting of the metallic powder particles and cooling of the mass to form the brazement.

10. A brazing process comprising:
    selecting at least one nickel-base superalloy substrate and a mass of metallic powder particles having a higher melting temperature than the substrate, the substrate and the metallic powder particles being selected on the basis of the substrate being sufficiently large to reflect microwave radiation at a power level and frequency level and at least some of the metallic powder particles having a maximum particle size of less than 100 nanometers to cause selective coupling of the metallic powder particles with the microwave radiation at the power and frequency levels when the metallic powder particles and the substrate are simultaneously subjected to the microwave radiation at the power and frequency levels, wherein the selective coupling of the metallic powder particles is characterized by eddy currents induced in the metallic powder particles by the magnetic field of the microwave radiation;
    applying the mass of metallic powder particles to a surface of the substrate;
    subjecting the mass to the microwave radiation at the power and frequency levels so that the substrate reflects the microwave radiation and the metallic powder particles within the mass couple with the microwave radiation and sufficiently melt to metallurgically bond to the substrate; and then interrupting the microwave radiation and allowing the mass to cool, solidify, and form a solid brazement.

11. The process according to claim 10, wherein the metallic composition of the metallic powder particles contains less than one weight percent of boron and/or less than three weight percent of silicon.

12. The process according to claim 10, wherein the metallic composition of the metallic powder particles contains boron and silicon as impurities only.

13. The process according to claim 10, wherein all of the metallic powder particles have a maximum particle size of about 100 micrometers.

14. The process according to claim 10, wherein the brazement metallurgically bonds to the substrate to form a repair region on the substrate as a result of the melting of the metallic powder particles and cooling of the mass to form the brazement.

15. The process according to claim 10, wherein the brazement metallurgically bonds the substrate to a second substrate as a result of the melting of the metallic powder particles and cooling of the mass to form the brazement.

* * * * *